United States Patent
Toguchi

(10) Patent No.: US 8,040,427 B2
(45) Date of Patent: Oct. 18, 2011

(54) IMAGING DEVICE AND AUTOFOCUSING METHOD

(75) Inventor: Masaaki Toguchi, Toyota (JP)

(73) Assignee: Elmo Company, Limited (JP)

( * ) Notice: Subject to any disclaimer, the term of this patent is extended or adjusted under 35 U.S.C. 154(b) by 992 days.

(21) Appl. No.: 11/946,180

(22) Filed: Nov. 28, 2007

(65) Prior Publication Data

US 2009/0059062 A1 Mar. 5, 2009

(30) Foreign Application Priority Data

Jan. 9, 2007 (JP) ................................. 2007-001107

(51) Int. Cl.
*H04N 5/232* (2006.01)
(52) U.S. Cl. ......... 348/345; 348/349; 348/353; 348/354
(58) Field of Classification Search ............. 348/208.12, 348/222.1, 345, 346, 347, 348, 349, 350, 348/351, 353, 354, 355, 356
See application file for complete search history.

(56) References Cited

U.S. PATENT DOCUMENTS

| | | | | |
|---|---|---|---|---|
| 5,448,306 A | * | 9/1995 | Koyama ..................... | 348/678 |
| 5,638,122 A | * | 6/1997 | Kawaguchi et al. .......... | 348/349 |
| 7,345,706 B2 | * | 3/2008 | Kanayama et al. ........... | 348/353 |
| 2006/0028579 A1 | * | 2/2006 | Sato .............................. | 348/362 |

FOREIGN PATENT DOCUMENTS

| | | |
|---|---|---|
| JP | 1-125065 | 5/1989 |
| JP | 7-87377 | 3/1995 |
| JP | 2006-79069 | 3/2006 |

* cited by examiner

*Primary Examiner* — David Ometz
*Assistant Examiner* — Peter Chon
(74) *Attorney, Agent, or Firm* — Ostrolenk Faber LLP

(57) ABSTRACT

In a digital video camera according to one aspect of the invention, a black level of a video signal is specified during an initialization process. An autofocusing process obtains an AF evaluation value and a brightness evaluation value at each current position of a compensator lens and updates a maximum AF evaluation value and a corresponding position of the compensator lens based on the obtained data. The autofocusing process also detects an AGC gain, computes an offset value of the AF evaluation value from the detected AGC gain, the obtained brightness evaluation value, and the specified black level, and calculates a threshold value from the computed offset value and the updated maximum AF evaluation value. When the obtained AF evaluation value is less than the calculated threshold value, the lens position corresponding to the maximum AF evaluation value is specified as the focus position. When the obtained AF evaluation value is not less than the calculated threshold value, on the other hand, this series of processing is repeated with a position shift of the compensator lens by a preset number of steps. This arrangement ensures efficient and precise hill-climbing autofocus control in view of the potential influence of high frequency noise in the digital video camera or another electronic camera.

9 Claims, 7 Drawing Sheets

Fig.5A

| α | | AGC GAIN (Gj) | | |
|---|---|---|---|---|
| | | Gj<6dB | 6dB≦Gj<12dB | 12dB≦Gj |
| BRIGHTNESS EVALUATION VALUE (Lj) | Lj<255 | 1 | 1.5 | 2 |
| | 255≦Lj<512 | 1.2 | 1.8 | 2.4 |
| | 512≦Lj | 1.5 | 2 | 3 |

Fig.5B

| β | | AGC GAIN (Gj) | | |
|---|---|---|---|---|
| | | Gj<6dB | 6dB≦Gj<12dB | 12dB≦Gj |
| BRIGHTNESS EVALUATION VALUE (Lj) | Lj<255 | 3 | 3.4 | 3.7 |
| | 255≦Lj<512 | 3.1 | 3.6 | 3.9 |
| | 512≦Lj | 3.2 | 3.7 | 4.1 |

IMAGING DEVICE AND AUTOFOCUSING METHOD

CLAIM OF PRIORITY

The present application claims the priority from Japanese application P2007-1107A filed on Jan. 9, 2007, the contents of which are hereby incorporated by reference into this application.

BACKGROUND

1. Field of the Invention

The present invention relates to an autofocusing technique for an imaging device that converts an optical image, which is captured via an optical system having a focusing function, into a video signal by means of an imaging system.

2. Description of the Related Art

The advance of the digital techniques has boosted the spread of digital video cameras and other electronic cameras. The electronic camera generally has an autofocusing mechanism that automatically adjusts the position of a focus lens to be focused on a subject. One typical technique adopted for the autofocusing mechanism is hill-climbing control. The hill-climbing control obtains an AF evaluation value, while moving back and forth the position of the focus lens along an optical axis. The AF evaluation value represents a high frequency component of a brightness signal that is generated by a CCD or another imaging element and is detected by a wave detector. The position of the focus lens giving a peak of the AF evaluation value is specified as a focus position, and the focus lens is controlled to be set in this specified focus position. An edge area of a captured image generally has a large fraction of high frequency component. Among captured images in a fixed depth of field, the image with the greater AF evaluation value is expected to have the sharper edge or the higher degree of focus. This is the reason why the high frequency component is used for evaluation of focusing. Known examples of the electronic camera with such control mechanism are disclosed in JP-A-1-125065, JP-A-7-87377, and JP-A-2006-79069.

The AF evaluation value obtained in the hill-climbing control, however, includes high frequency noise, which may interfere with accurate autofocusing control. There would thus be a demand for a technique of efficiently and accurately performing autofocusing control in view of potential influence of noise.

SUMMARY

One aspect of the invention pertains to an imaging device that converts an optical image, which is captured via an optical system having a focusing function, into a video signal by means of an imaging system. The imaging device includes: a high frequency component extractor that adjusts the video signal with a preset gain controlled according to an imaging condition and detects intensity of at least a specific signal in a certain frequency band, which includes a high frequency component and is generated in a focus state of the optical image captured via the optical system, from the adjusted video signal; a learning module that learns the intensity of the specific signal detected in an out-of-focus state of the optical image captured via the optical system, as an offset value; and an optical system controller that refers to the learnt offset value to estimate an adjustment direction of the optical system giving a peak of the detected intensity of the specific signal and controls the optical system in the estimated adjustment direction to be set in the focus state.

The imaging device according to this aspect of the invention learns the intensity of the specific signal detected in the out-of-focus state of the optical image, as the offset value. The imaging device refers to this learnt offset value to estimate the adjustment direction of the optical system giving the peak of the intensity of the specific signal and controls the optical system in the estimated adjustment direction to be set in the focus state. This arrangement desirably enables highly accurate autofocusing control even in the depth of field having low contrast and low ilbrightness, which is readily affected by influence of noise.

The technique of the invention is not restricted to the imaging device having the configuration discussed above but may be actualized by other applications, for example, an autofocusing method.

BRIEF DESCRIPTION OF THE DRAWINGS

FIGS. 5A and 5B show one example of a threshold coefficient table to be referred to in the autofocusing process of FIG. 4;

DESCRIPTION OF THE PREFERRED EMBODIMENTS

Figure 1:
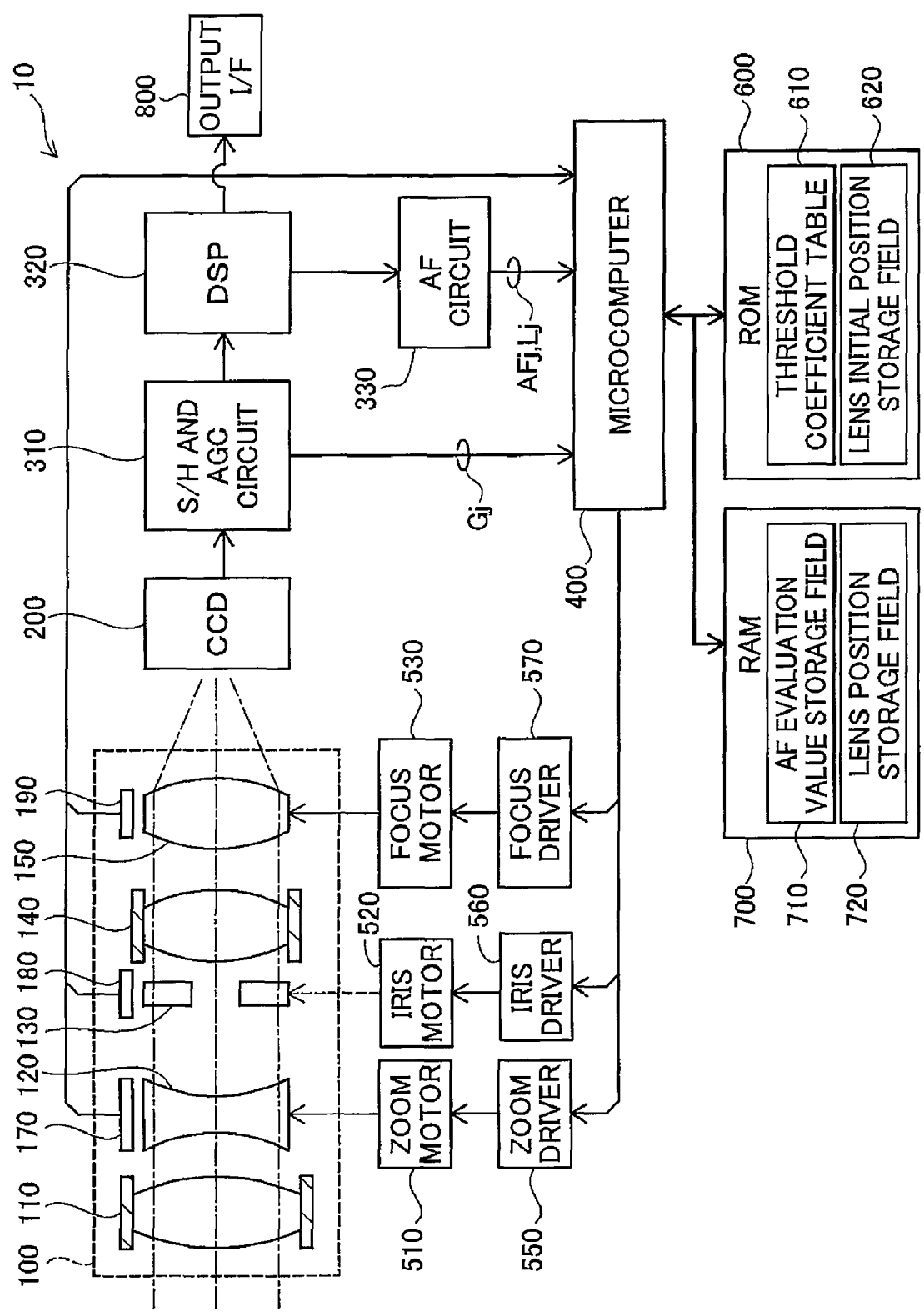
FIG. 1 is a block diagram illustrating the schematic structure of a digital video camera in one embodiment of the invention.

One mode of carrying out the invention is described below in the following sequence with reference to the accompanied drawings:

(1) General Structure of Digital Video Camera
(2) Initialization Process
(3) Autofocusing Process
(4) Other Aspects (1) General Structure of Digital Video Camera FIG. 1 is a block diagram illustrating the schematic structure of a digital video camera 10 in one embodiment of the invention. The digital video camera 10 is a fixed security camera having hill-climbing autofocus functions. As illustrated in FIG. 1, the digital video camera 10 includes a lens block 100, a CCD 200, a sample hold (S/H) and AGC (automatic gain control) circuit 310, a DSP (digital signal processor) 320, an AF circuit 330, a microcomputer 400, lens and iris drive motors 510 to 530, lens and iris drivers 550 to 570, a ROM 600, a RAM 700, and an output interface 800.

The lens block 100 includes a first stationary lens 110, a movable variator lens 120 having a variable magnification function, an iris 130 having a function of regulating the quantity of light passing through the lens, a second stationary lens 140, a movable compensator lens 150 having both a focusing function and a function of correcting a focus position at the magnification change, position detectors 170 and 190 respectively detecting the position of the variator lens 120 and the position of the compensator lens 150, and an aperture setting detector 180 detecting an aperture setting of the iris 130. This series of lenses adjusts the magnitude, the light quantity, and the focus of an entered optical image in a certain depth of field and focuses the adjusted optical image on the plane of the CCD 200. Each of these lenses is assumed to be constructed as a single lens component in the description of this embodiment for the convenience of explanation, but may have multiple lens components.

The CCD 200 is an imaging element of converting the focused optical image into an electric signal. Another imaging element, such as a CMOS, may replace the CCD used as the imaging element in this embodiment.

The sample hold and AGC circuit 310 removes switching noise from the output of the CCD 200 to extract a signal component, while controlling the gain to keep a constant output signal level. The DSP 320 is a specific processor that converts the analog signal output from the sample hold and AGC circuit 310 into a digital signal to generate a brightness signal and a chromatic signal and performs a required series of processing including gamma correction, aperture correction, and white balance adjustment. The AF circuit 330 detects an AF evaluation value and a brightness evaluation value (described later) from the video signal output from the DSP 320 and includes a high pass filter, an absolute value circuit, and a wave detector.

The zoom motor 510 and the focus motor 530 are stepping motors to respectively shift the position of the variator lens 120 and the position of the compensator lens 150 for adjusting the magnification and for focusing. The iris motor 520 is a galvanometer to open and close the iris 130 for regulating the quantity of light.

According to a control program stored in the ROM 600, the microcomputer 400 activates the focus motor 530 via the focus driver 570 to shift the position of the compensator lens 150 and accomplish the autofocusing control, in order to maximize the AF evaluation value obtained by the AF circuit 330. The microcomputer 400 also controls the operations of the whole digital video camera 10.

The ROM 600 stores control programs that are required for the operations of the digital video camera 10 and are executed by the microcomputer 400, as well as a threshold coefficient table 610 (described later). The ROM 600 has a lens initial position storage field 620 set for storage of the initial positions of the variator lens 120 and the compensator lens 150.

In the structure of the embodiment, the variator lens 120 and the compensator lens 150 are moved to preset focus positions prior to start of the autofocusing control at the power-on time of the digital video camera 10 for image capturing. According to a typical procedure for the efficient hill-climbing autofocus control, the manufacturer sets in advance the position of a specific lens generally expected to have the high probability for focusing and the position of another specific lens suitable for the user's frequently adopted imaging conditions. The digital video camera 10 of the embodiment starts the autofocusing control after moving the variator lens 120 and the compensator lens 150 to these manufacturer's preset positions. The initial positions stored in the lens initial position storage field 620 set in the ROM 600 represent these preset positions of the variator lens 120 and the compensator lens 150 for the start of the autofocusing control. The lens initial position storage field 620 may be set in a nonvolatile RAM or an EEPROM, in place of the ROM 600. The user's desired initial positions, as well as the manufacture's preset initial positions may be stored in the lens initial position storage field 620.

The RAM 700 has a work area for executing the control programs, as well as storage areas including an AF evaluation value storage field 710 and a lens position storage field 720. These storage areas may be set in an internal register of the microcomputer 400.

The output interface 800 functions to output video data captured by the digital video camera 10. For example, connection of a monitor (not shown) to the output interface 800 enables the video data captured by the digital video camera 10 to be displayed on the monitor screen.

(2) Initialization Process

Figure 2:
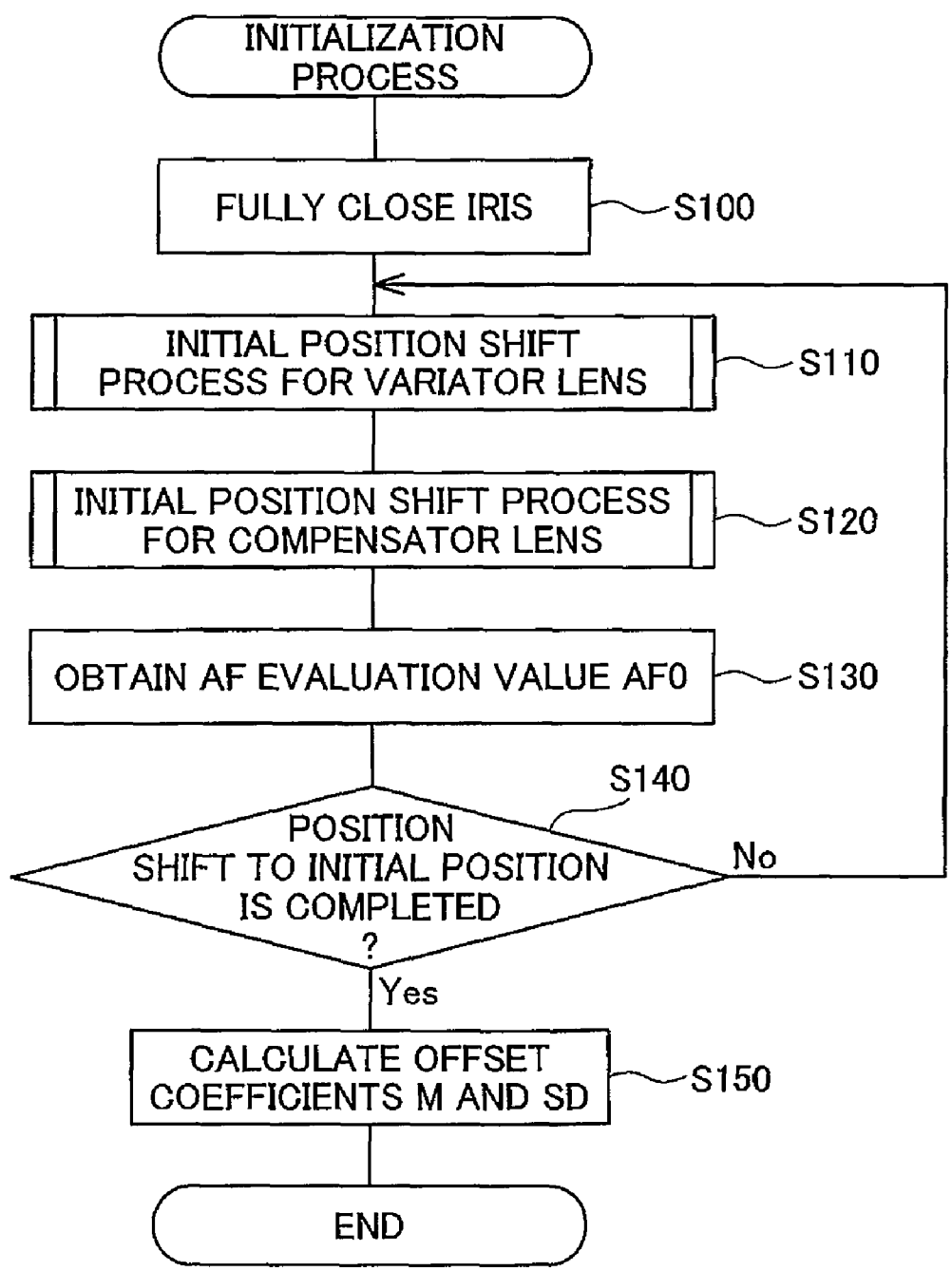
FIG. 2 is a flowchart showing an initialization process executed in response to a power-on operation of the digital video camera.

FIG. 2 is a flowchart showing an initialization process executed in response to a power-on operation of the digital video camera 10. The initialization process may be performed on the occasion of regular refreshing operations, as well as in response to the power-on operation of the digital video camera 10. In the initialization process, a process of moving the variator lens 120 and the compensator lens 150 to preset respective initial positions is executed in parallel to a process of collecting information required for consideration of the potential influence of noise in a subsequent autofocusing control (described later).

On the start of this initialization process in response to the user's power-on operation of the digital video camera 10, the microcomputer 400 fully closes the iris 130 (step S100) and starts an initial position shift process for the variator lens 120 (step S110).

Figure 3:
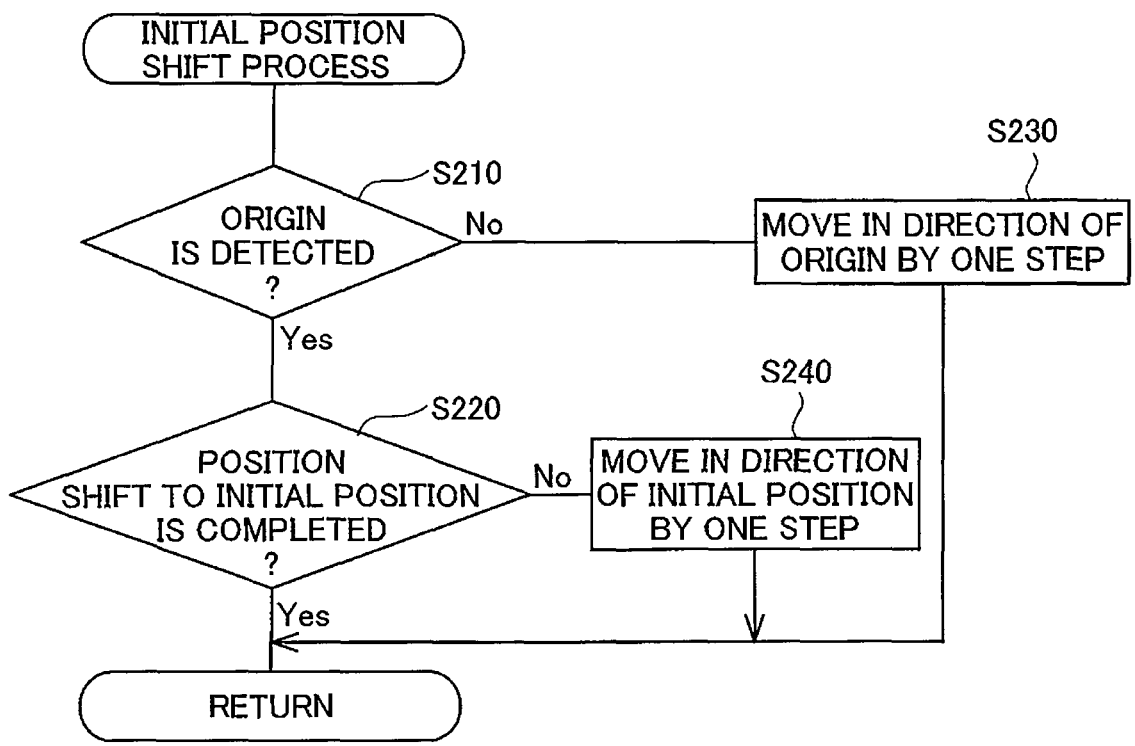
FIG. 3 is a flowchart showing the details of an initial position shift process of a variator lens executed at step S110 in the initialization process of FIG. 2.

The details of the initial position shift process are described with reference to FIG. 3. FIG. 3 is a flowchart showing the details of the initial position shift process for the variator lens 120 executed at step S110 in the initialization process of FIG. 2. In the initial position shift process, the microcomputer 400 first determines whether the position detector 170 for the variator lens 120 detects the position of the origin (step S210). In response to detection of the position of the origin (step S210: yes), it is subsequently determined whether the variator lens 120 has already been moved to an initial position preset as a position apart from the origin by a predetermined number of steps (step S220). Upon completion of the position shift to the initial position (step S220: yes), the microcomputer 400 immediately terminates this initial position shift process of FIG. 3 and returns to the initialization process of FIG. 2.

At the start of the initialization process, the compensator lens 150 is located at a previous power-off position. The predetermined number of steps represents a moving distance corresponding to 1 pulse of the zoom motor 510. The initial position of the variator lens 120 is managed by storing the number of steps from the origin into the lens initial position storage field 620.

In the digital video camera 10 of the embodiment, the position detector 170 has a photo sensor at the position of the origin of the variator lens 120. A light shielding plate fastened to the variator lens 120 moves back and forth between a light emitter and a light receiver of the photo sensor with the position shift of the variator lens 120. The specific position of giving a variation in output of the light receiver is detected as the position of the origin. This technique is, however, not essential, but the position of the origin may be detected by any other technique utilizing, for example, electricity, electrostatic capacitance, or magnetism.

In the case of no detection of the origin by the position detector 170 (step S210: no), on the other hand, the microcomputer 400 outputs a command to the zoom driver 550 and activates the zoom motor 510 to shift the position of the variator lens 120 by one step in the direction of the origin (step S230). The microcomputer 400 then terminates the initial position shift process of FIG. 3 and returns to the initialization process of FIG. 2.

Upon the incomplete position shift of the variator lens 120 to the initial position (step S220: no), however, the microcomputer 400 outputs a command to the zoom driver 550 and activates the zoom motor 510 to shift the position of the variator lens 120 by one step in the direction of the initial position (step S240). The microcomputer 400 then terminates the initial position shift process of FIG. 3 and returns to the initialization process of FIG. 2.

Referring back to the flowchart of FIG. 2, the microcomputer 400 starts an initial position shift process for the compensator lens 150 (step S120). The initial position shift process for the compensator lens 150 follows the details of the initial position shift process for the variator lens 120 described above with reference to the flowchart of FIG. 3 and is thus not specifically described here.

The microcomputer 400 then controls the AF circuit 330 to obtain an AF evaluation value AF0 at the initial position of the variator lens 120 and the initial position of the compensator lens 150 respectively moved at steps S110 and S120 (step S130). According to a concrete procedure of obtaining the AF evaluation value, the high pass filter in the AF circuit 330 extracts a high frequency component of the brightness signal, and the absolute value circuit converts the extracted high frequency component into an absolute value. The gate circuit subsequently extracts only signal components present in a distance measurement range. The wave detector detects a signal peak of the extracted signal components as the AF evaluation value. In the structure of the embodiment, the high pass filter is designed to enable selection of the shielding frequency between two options, 1 MHz and several tens kHz, corresponding to a variation in depth of field. These shielding frequencies are, however, not restrictive, but the high pass filter may adopt only one of these shielding frequencies or any other suitable shielding frequency. In the structure of this embodiment, the AF evaluation value AF0 is obtained in response to a 60 Hz vertical synchronizing signal.

The AF evaluation value is obtained at every preset shift position of the moving compensator lens 150 in the course of autofocusing control. The position of the compensator lens 150 corresponding to a peak of the AF evaluation value is regulated as the focus position. The AF evaluation value AF0 is obtained in the fully closed state of the iris 130 and accordingly represents a black level of a video signal. The black level is thus regarded as a video signal in a completely out-of-focus state in the set depth of field.

It is desirable to obtain the black level in a fixed condition, that is, in the condition of an AGC gain fixed to a preset value. The black level is specified in the condition of the AGC gain fixed to 0 dB in this embodiment, although the AGC gain may be fixed to any other suitable value.

The microcomputer 400 then determines whether both the variator lens 120 and the compensator lens 150 have been moved to the respective initial positions (step S140). In the case of the incomplete position shift of at least one of the variator lens 120 and the compensator lens 150 to the corresponding initial position (step S140: no), the processing flow returns to step S110 and repeats the processing of steps S110 to S130 to shift the position of the variator lens 120 and/or the position of the compensator lens 150 by one step and obtain the AF evaluation value AF0.

The AF evaluation value AF0 is obtained at every position shift of the variator lens 120 and/or the compensator lens 150 during repetition of the processing. When the variator lens 120 and the compensator lens 150 are eventually moved to the respective initial positions (step S140: yes), the microcomputer 400 calculates offset coefficients M and SD from the obtained AF evaluation values AF0 (step S150). The offset coefficients M and SD are used for calculation of an offset value OFF as the noise level of the AF evaluation value in the subsequent autofocusing process (described later), which is performed to specify the focus position in view of the potential influence of noise. The offset coefficients M and SD are given as an average and a standard deviation of 'N' AF evaluation values $AF0(i)$ (where i denotes an integer in the range of 0 to N) obtained at step S130. Namely the offset coefficients M and SD are expressed by Equations (1) and (2) given below:

$$M = \frac{\sum_{i=1}^{N} AF0(i)}{N} \quad (N \geq 1 \text{ and } N \text{ denotes an integer.}) \tag{1}$$

$$SD = \sqrt{\frac{\sum_{i=1}^{N}(AFo(i) - M)^2}{N - 1}} \tag{2}$$

On completion of the above series of initialization process, the digital video camera 10 is ready for image capturing under autofocusing control. The digital video camera 10 specifies the black level as the out-of-focus video signal in the fully closed position of the iris 130. This ensures accurate detection of the black level, regardless of the state of the lens block 100. Acquisition of multiple black levels enables sufficient reflection of a variation in black level and enhances the accuracy of the subsequent autofocusing process.

The initialization process of the embodiment obtains the AF evaluation value AF0 at all the step positions until complete position shift of the variator lens 120 and the compensator lens 150 to the respective initial positions. The initialization process generally requires 1 to 5 seconds according to the positions of the variator lens 120 and the compensator lens 150 on the power-on time of the digital video camera 10. Approximately 60 to 300 AF evaluation values AF0 are thus obtained in the initialization process. Acquisition of the AF evaluation value AF0 is, however, not restricted to this procedure. One modified procedure may stop acquisition of any new AF evaluation value AF0 at step S130 when the number of obtained AF evaluation values AF0 reaches a preset value (for example, 30). Another modified procedure may obtain the AF evaluation value AF0 in response to every position shift of the variator lens 120 and the compensator lens 150 by a preset number of steps. Such modifications desirably enhance the processing speed of calculating the offset coefficients M and SD at step S150.

The procedure of the embodiment specifies the black level from the video signal in the fully closed position of the iris 130. This is, however, not essential, but another method may be adopted for acquisition of the black level. One alternative procedure may specify the black level from an optical black signal of the CCD 200.

(3) Autofocusing Process

Figure 4:
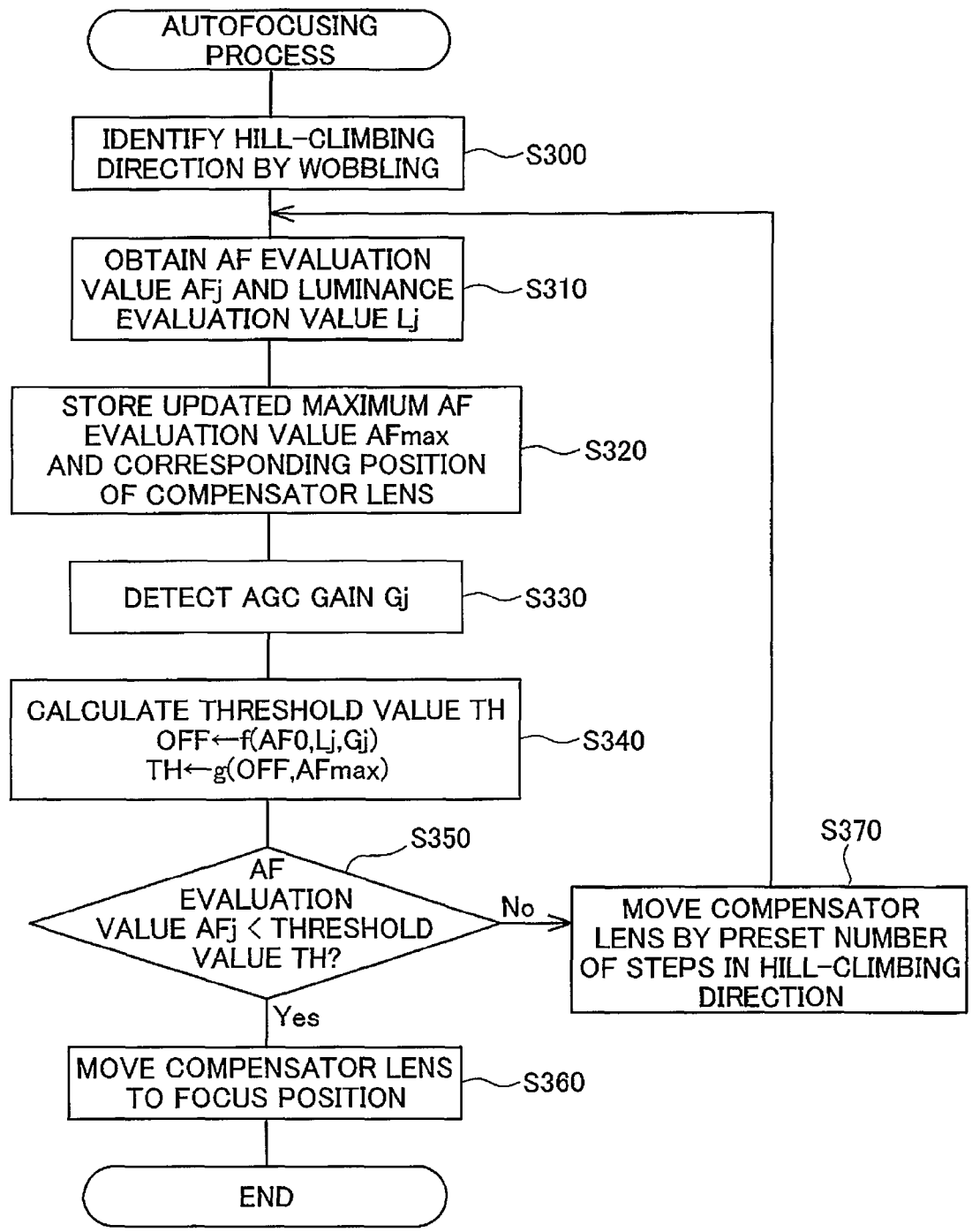
FIG. 4 is a flowchart showing an autofocusing process executed in the digital video camera.

FIG. 4 is a flowchart showing an autofocusing process executed in the digital video camera 10. On the start of the autofocusing process, the microcomputer 400 first identifies a hill-climbing direction by wobbling (step S300). A concrete procedure of identification by wobbling obtains the AF evaluation value, while moving the compensator lens 150 back and forth. The moving direction of the compensator lens 150 that approaches to a peak of the AF evaluation value is identified by referring to a variation of the AF evaluation value. The identified moving direction that approaches to the peak of the AF evaluation value is set to the hill-climbing direction.

After identification of the hill-climbing direction, the microcomputer 400 controls the AF circuit 330 to obtain an AF evaluation value AFi and a brightness evaluation value Lj at the current position of the compensator lens 150 (step S310). The AF circuit 330 integrates the brightness signal over one field to obtain the brightness evaluation value Lj. The AF evaluation value AFj and the brightness evaluation value Lj are obtained in response to the 60 Hz vertical synchronizing signal.

The microcomputer 400 then updates a maximum AF evaluation value AFmax among the so-far obtained AF evaluation values AFj and stores the maximum AF evaluation value AFmax and the corresponding position of the compensator lens 150 giving the maximum AF evaluation value AFmax respectively into the AF evaluation value storage field 710 and the lens position storage field 720 set in the RAM 700 (step S320). When the currently obtained AF evaluation value AFj is the first AF evaluation value AFj, the obtained AF evaluation value AFj and the corresponding position of the compensator lens 150 are stored into the respective storage fields 710 and 720.

After storage of the maximum AF evaluation value AFmax and the corresponding position of the compensator lens 150, the microcomputer 400 controls the sample hold and AGC circuit 310 to detect an AGC gain Gj (step S330).

The microcomputer 400 subsequently computes an offset value OFF as the noise level of the AF evaluation value AFj from the brightness evaluation value Lj obtained at step S310 and the AGC gain Gj detected at step S330, and calculates a threshold value TH used as a criterion for detecting a peak of the AF evaluation value AFj from the computed offset value OFF (step S340).

The calculation of the threshold value TH may follow a concrete procedure described herein. The procedure refers to the threshold coefficient table 610 and extracts the values of coefficients α and β used for calculation of the offset value OFF as the noise level of the AF evaluation value AFj. The offset value OFF is affected by the AGC gain Gj and the brightness evaluation value Lj, in addition to the black level (that is, the AF evaluation value AF0). The values of the coefficients α and β are thus extracted with these affecting data as parameters. FIGS. 5A and 5B show one example of the threshold coefficient table 610. The threshold coefficient table 610 correlates the brightness evaluation value Lj obtained at step S310 and the AGC gain Gj detected at step S330 to the coefficients α and β. The coefficients α and β are unequivocally determined corresponding to the range of the AGC gain Gj and the range of the brightness evaluation value Lj. In the illustrated example, the coefficients α=1.8 and β=3.6 are given when the AGC gain Gj is in a range of 6 dB≦Gj<12 dB and the brightness evaluation value Lj is in a range of 255≦Lj<512. The relations of the coefficients α and β to the AGC gain Gj and the brightness evaluation value Lj are set according to the experimental data and the camera properties and are not restricted to this illustrated example. Different values may be adopted for these coefficients α and β, and different grouping may be adopted for the range of the AGC gain Gi and the range of the brightness evaluation value Lj. Another possible modification may calculate the coefficients α and β according to a specified function with the AGC gain Gj and the brightness evaluation value Lj as parameters.

The offset value OFF is computed from the extracted values of the coefficients α and β and the offset coefficients M and SD calculated at step S150 according to Equation (3) given below:

$$\text{OFF} = \alpha \cdot M + \beta \cdot SD \quad (3)$$

The threshold value TH is subsequently calculated from the computed offset value OFF, the maximum AF evaluation value AFmax stored in the AF evaluation value storage field 710 at step S320, and a coefficient γ according to Equation (4) given below:

$$TH = (AF\max - \text{OFF}) \cdot \gamma + \text{OFF} \quad (4)$$

The coefficient γ is set as a criterion for identifying the peak position of the AF evaluation value or the focus position without influence of a potential noise-induced error on the maximum AF evaluation value AFmax and is, for example, equal to 0.8.

Referring back to the flowchart of FIG. 4, after the calculation of the threshold value TH, the microcomputer 400 determines whether the AF evaluation value AFj at the current position of the compensator lens 150 obtained at step S310 is smaller than the calculated threshold value TH (step S350). When the current AF evaluation value AFj is smaller than the threshold value TH (step S350: yes), it is determined that the position of the compensator lens 150 corresponding to the maximum AF evaluation value AFmax stored in the lens position storage field 720 is specified as the focus position. The microcomputer 400 then reads out the specified focus position and gives a command to the focus motor 530 via the focus driver 570 to move the compensator lens 150 to the focus position (step S360).

When the current AF evaluation value AFj is not smaller than the threshold value TH (step S350: no), on the other hand, the microcomputer 400 moves the compensator lens 150 by a preset number of steps in the identified hill-climbing direction (step S370) and returns the processing to step S310. This series of processing is repeated until it is determined at step S350 that the AF evaluation value Afj is smaller than the threshold value TH.

Figure 6A:
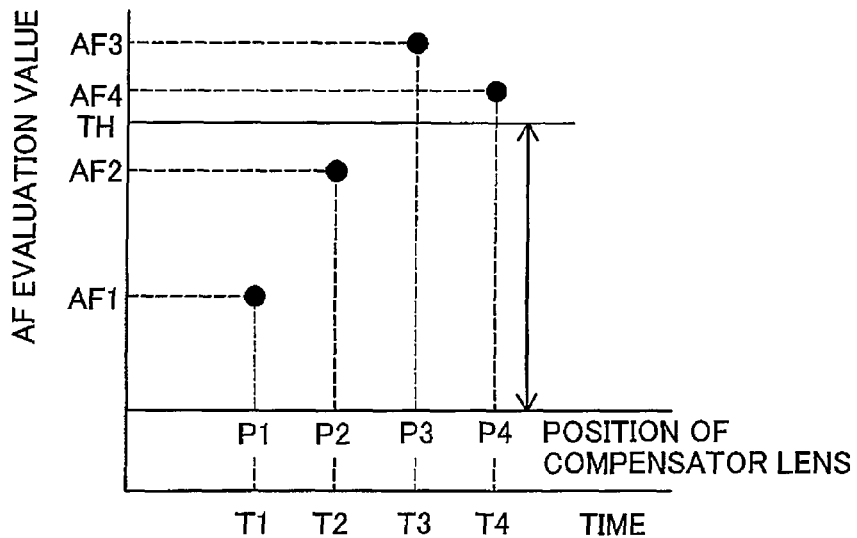
FIGS. 6A and 6B show one example of detecting a peak of an AF evaluation value relative to a threshold value TH as a criterion.

The processing of steps S310 to S370 is further explained with reference to FIG. 6. In the state of FIG. 6A, acquisition of the AF evaluation value AFj (step S310) starts at a position P1 of the compensator lens 150. Through the repetition of the processing of steps S310 to S350 and S370, the position of the compensator lens 150 is sequentially shifted from the position P1 to a position P4 with elapse of the pulse time of the 60 Hz vertical synchronizing signal from a time point Ti to a time point T4. AF evaluation values AF1 to AF4 are obtained at the respective positions P1 to P4. The AF evaluation value AF3 is stored as the maximum among the obtained AF evaluation values AF1 to AF4 in the AF evaluation storage field 710, and the corresponding position P3 for the maximum AF evaluation value AF3 is stored in the lens position storage field 720.

In this state, it is determined at step S350 that the latest AF evaluation value AF4 is still not less than the threshold value TH. Namely the latest AF evaluation value AF4 has only a little decrease from the maximum AF evaluation value AF3. The cause of this little decrease of the AF evaluation value is not elucidated here. The decrease of the AF evaluation value may be ascribed to a lowered focus degree of an image represented by an imaging signal or to a simple variation in offset value OFF. It is accordingly undeterminable whether any new maximum AF evaluation value of not less than the current maximum AF evaluation value AF3 would be found by the further rightward (in the drawing) shift of the compensator lens 150. The position of the compensator lens 150 is thus further shifted rightward (in the drawing) at step S370, and a subsequent variation in AF evaluation value is monitored.

Figure 6B:
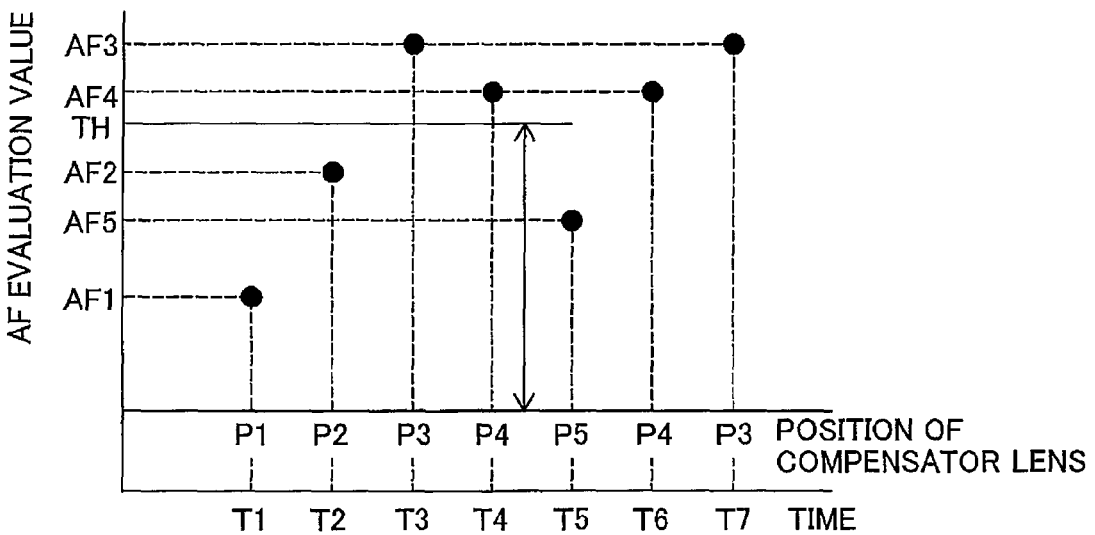

In the state of FIG. 6B, the compensator lens 150 is further moved to a next position P5, and an AF evaluation value AF5 is obtained at the position P5. When it is determined at step S350 that the latest AF evaluation value AF5 is smaller than the threshold value TH, the decrease of the AF evaluation value is ascribed to the cause other than the simple variation in offset value OFF, that is, to the lowered focus degree of the image represented by the imaging signal. It is accordingly estimated that no new maximum AF evaluation value of greater than the current maximum AF evaluation value AF3 would be found by the further rightward shift of the compensator lens 150. The repeated processing flow is then terminated here, and the position P3 corresponding to the eventual maximum AF evaluation value AF3 as the peak of the AF evaluation value is specified as the focus position. With elapse of the pulse time to time points T6 and T7, the compensator lens 150 is moved back from the position P5 to the position P3. On the assumption of no variation in depth of field, the AF evaluation value AFj obtained at the time points T6 and T7 are respectively equal to the AF evaluation value AF4 obtained at the time point T4 and the AF evaluation value AF3 obtained at the time point T3. The AF evaluation value AFj is, however, varied with a variation in depth of field.

Figure 7A:
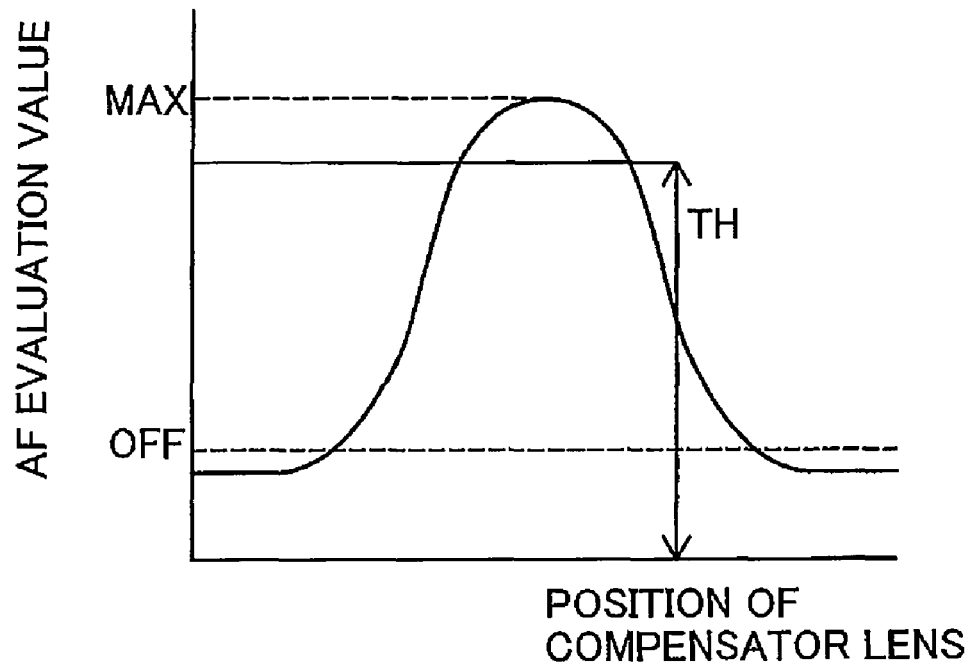
FIGS. 7A and 7B show peaks of the AF evaluation value in relation to the threshold value TH and an offset value OFF.
Figure 7B:
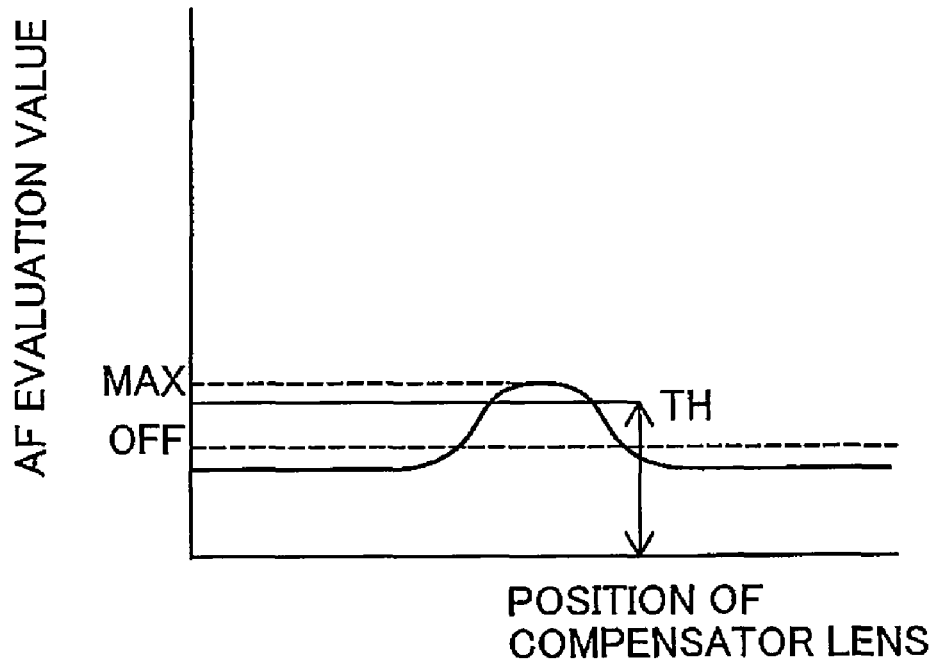

In the digital video camera 10 of the embodiment, the peak of the AF evaluation value is specified by comparison between the AF evaluation value and the threshold value TH calculated from the offset value OFF. This arrangement enables detection of the peak of the AF evaluation value with high accuracy and ensures the precise autofocusing control not only in the state of unsusceptible noise effect with a significantly large variation in AF evaluation value relative to the offset value OFF as shown in FIG. 7A but in the state of rather susceptible noise effect with a relatively small variation in AF evaluation value relative to the offset value OFF as shown in FIG. 7B, for example, even in the field of depth having a low contrast and a low ilbrightness.

The peak of the AF evaluation value is specified according to the threshold value TH in view of the effect of the offset value OFF. This arrangement allows the greater coefficient $\gamma$ to be used in Equation (4) given above and thus ensures the higher speed detection of the peak of the AF evaluation value, compared with the arrangement without consideration of the effect of the offset value OFF.

The offset value OFF is computed from the black level regarded as the completely out-of-focus state, as well as the AGC gain and the brightness evaluation value affecting the noise. This arrangement ensures determination of the offset value OFF with high accuracy. The offset value OFF may be regarded as a minimum AF evaluation value. The availability of autofocusing control is thus precisely determinable according to the comparison between the obtained AF evaluation value and the offset value OFF.

The digital video camera 10 of the embodiment specifies the black level in the initialization process where the variator lens 120 and the compensator lens 150 are moved to the respective initial positions. This arrangement does not require any extra time for acquisition of the black level and thus ensures efficient preparation for the autofocusing control.

In the embodiment described above, the initial position shift process of FIG. 3 is performed at the power-on time of the digital video camera 10. Execution of the initial position shift process is, however, not restricted to this timing but may be performed on other occasions. For example, a security camera continuously used for a long time period may be subjected to a refresh operation at regular intervals, for example, once a day. The initial position shift process may also be performed as the timing of the refresh operation. This modified arrangement enables the AF evaluation value AF0 (black level) required for calculation of the threshold value TH in the autofocusing control to be updated at the regular intervals, thus ensuring the highly accurate autofocusing control.

The autofocusing process of the embodiment obtains the brightness evaluation value and detects the AGC gain, in response to every acquisition of the AF evaluation value at step S310. The autofocusing process then calculates the threshold value TH at step S340 and compares each obtained AF evaluation value with the calculated threshold value TH at step S350. The process of specifying the focus position is, however, not restricted to this procedure. One modified procedure may execute this series of processing only when the maximum AF evaluation value is not updated or overwritten at step S320. When the maximum AF evaluation value is updated and overwritten at step S320, the modified procedure may move the compensator lens 150 by a preset number of steps and return to step S310. This modification skips the processing of steps S330 to S350 in the phase of clearly unable to identify the peak of the AF evaluation value, thus desirably enhances the overall processing speed.

In the embodiment described above, the black level required for computation of the offset value OFF is specified in the initialization process where the variator lens 120 and the compensator lens 150 are moved to the respective preset initial positions. Acquisition of the black level is, however, not restricted to this timing but may be performed at any of various timings having no significant effect on image capture. For example, one modified procedure may specify the black level in response to the user's power-off operation of the digital video camera 10 and store the specified black level in a nonvolatile memory. The stored black level may be used when the digital video camera 10 is powered on again.

The autofocusing process of the embodiment computes the offset value OFF based on the black level. The actual offset value OFF in the imaging time with the digital video camera 10 is affected by a noise increase with an increased light quantity and is greater than the value computed according to Equation (3) given above. One possible modification may thus perform correction to increase the specified black level according to the light quantity in the imaging time and compute the offset value OFF based on the corrected black level. Another possible modification may set the offset coefficients $\alpha$ and $\beta$ in view of such influence of noise. These modifications ensure the more accurate computation of the offset value OFF.

(4) Other Aspects

The imaging device constructed as the digital video camera in the above embodiment may have any of the following applications. In one preferable application of the imaging device, the optical system controller has a focus state identification module that specifies the peak of the detected intensity of the specific signal by referring to the learnt offset value and identifies the focus state of the optical system to give the peak of the detected intensity of the specific signal. The optical system controller controls the optical system to be set in the identified focus state.

The imaging device of this application specifies the peak of the specific signal by referring to the learnt offset value and controls the optical system to be set in the focus state giving the peak of the intensity of the specific signal. This arrangement effectively ensures highly accurate autofocusing control in view of the potential influence of noise.

In one preferable embodiment of the imaging device of this application, in the course of the control of the optical system in the estimated adjustment direction to be set in the focus state, when the detected intensity of the specific signal decreases below a threshold value that is computed from the learnt offset value and a detected maximum intensity of the specific signal, the optical system controller specifies the detected maximum intensity of the specific signal as the peak of the intensity of the specific signal.

In the imaging device of this preferable embodiment, the peak of the intensity of the specific signal is specified based on the threshold value computed from the learnt offset value and the detected maximum intensity of the specific signal. This arrangement enables accurate specification of the peak in view of the potential influence of noise.

In another preferable application of the imaging device, the optical system has: a lens unit that shifts position of at least one lens among multiple lenses included in the optical system to adjust a focal distance; and a moving actuator that moves the at least one lens. The optical system controller controls the moving actuator to move the at least one lens to a focus position of the lens unit.

In the imaging device of this application, the optical system has multiple lenses, and the focal distance is adjusted by moving the lens. The highly accurate autofocusing control is enabled in the imaging device having this structure.

In still another preferable application of the imaging device, the high frequency component extractor adjusts a black level video signal, which does not include light in a depth of field at or over a predetermined level, with the preset gain and detects an intensity of a black level signal from the adjusted black level video signal. The learning module uses at least the detected intensity of the black level signal to specify the intensity of the specific signal in the out-of-focus state, and learns the specified intensity of the specific signal as the offset value.

In the imaging device of this application, the offset value is learnt as the intensity of the black level signal, which is regarded as the completely out-of-focus state. This arrangement gives the offset value with high accuracy.

In one preferable structure of this application, the imaging device further has a brightness detector that measures intensity of a brightness signal of the video signal adjusted with the preset gain controlled according to the imaging condition. The learning module specifies the intensity of the specific signal in the out-of-focus state according to the detected intensity of the black level signal, the preset gain, and the measured intensity of the brightness signal and learns the specified intensity of the specific signal as the offset value.

In the imaging device of this structure, the offset value is learnt based on the gain and the intensity of the brightness signal that have significant effects on the noise, in addition to the intensity of the black level signal. This arrangement ensures the highly accurate autofocusing control with precise reflection of the potential influence of noise.

In one preferable embodiment of the imaging device of the above application, the high frequency component extractor detects the intensity of the black level signal multiple times. The learning module uses at least an average and a standard deviation of the intensity of the black level signal detected multiple times to specify the intensity of the specific signal in the out-of-focus state, and learns the specified intensity of the specific signal as the offset value.

In the imaging device of this embodiment, the offset value is learnt based on the intensity of the black level signal detected multiple times. This arrangement ensures sufficient reflection of a variation in black level on learning of the offset value and thus gives the offset value with high accuracy.

In another preferable structure of the above application, the imaging device further has an initialization module that performs required initialization for starting the control of the optical system to be set in the focus state. The high frequency component extractor detects the intensity of the black level signal during the initialization.

In the imaging device of this structure, the intensity of the black level signal is detected during the initialization. There is no extra time required for detection of the intensity of the black level signal and thus enables efficient preparation for the autofocusing control.

In another preferable embodiment of the imaging device of the above application, the optical system has an iris mechanism that regulates a light quantity of the optical image. The high frequency component extractor detects the intensity of the specific signal in a closed state of the iris mechanism to at least a predetermined extent, as the intensity of the black level signal.

In the imaging device of this embodiment, the high frequency component extractor detects the intensity of the black level signal in the closed state of the iris mechanism to at least the predetermined extent. This arrangement ensures easy detection of the intensity of the black level signal.

The embodiment and its modified examples discussed above are to be considered in all aspects as illustrative and not restrictive. There may be many other modifications, changes, and alterations without departing from the scope or spirit of the main characteristics of the present invention. The above embodiment regards the digital video camera 10 that shifts the position of the compensator lens 150 to attain the autofocusing control. The technique of the invention is, however, not restricted to the digital video camera 10 of this arrangement but is also applicable to a digital video camera that moves the position of the CCD 200 or changes the shape of the second stationary lens 140 by application of a voltage to attain the autofocusing control. The principle of the invention may further be adopted in diversity of imaging devices, including digital video cameras for business or industrial use, portable digital video cameras for consumer use, digital video cameras mounted on cellular phones, network cameras, as well as security cameras.

What is claimed is:

1. An imaging device that converts an optical image, which is captured via an optical system having a focusing function, into a video signal, the imaging device comprising:
   a high frequency component extractor that adjusts the video signal with a preset gain controlled according to an imaging condition and detects intensity of at least a specific signal in a certain frequency band, which includes a high frequency component and is generated in a focus state of the optical image captured via the optical system, from the adjusted video signal;
   a learning module that learns an offset value based on the intensity of the specific signal detected in an out-of-focus state of the optical image captured via the optical system; and
   an optical system controller that refers to the learnt offset value to estimate an adjustment direction of the optical system giving a peak of the detected intensity of the specific signal, and controls the optical system in the estimated adjustment direction to be set in the focus state;
   wherein the optical system controller has a focus state identification module that specifies the peak of the detected intensity of the specific signal by referring to the learnt offset value and identifies the focus state of the optical system to give the peak of the detected intensity of the specific signal, and the optical system controller controls the optical system to be set in the identified focus state; and wherein in the course of the control of the optical system in the estimated adjustment direction to be set in the focus state, when the detected intensity of the specific signal decreases below a threshold value that is computed from the learnt offset value and a detected maximum intensity of the specific signal, the optical system controller specifies the detected maximum intensity of the specific signal as the peak of the intensity of the specific signal.

2. The imaging device in accordance with claim 1, wherein the optical system has:

a lens unit that shifts position of at least one lens among multiple lenses included in the optical system to adjust a focal distance; and a moving actuator that moves the at least one lens, and the optical system controller controls the moving actuator to move the at least one lens to a focus position of the lens unit.

3. The imaging device in accordance with claim 1, wherein the high frequency component extractor adjusts a black level video signal, which does not include light in a depth of field at or over a predetermined level, with the preset gain and detects an intensity of a black level signal from the adjusted black level video signal, and the learning module learns the offset value based on at least the detected intensity of the black level signal.

4. The imaging device in accordance with claim 3, the imaging device further comprising a brightness detector that measures intensity of a brightness signal of the video signal adjusted with the preset gain controlled according to the imaging condition, wherein the learning module learns the offset value based on the detected intensity of the black level signal, the preset gain, and the measured intensity of the brightness signal.

5. The imaging device in accordance with claim 3, wherein the high frequency component extractor detects the intensity of the black level signal multiple times, and the learning module learns the offset value based on at least an average and a standard deviation of the intensity of the black level signal detected multiple times.

6. The imaging device in accordance with claim 3, the imaging device further comprising:

an initialization module that performs required initialization for starting the control of the optical system to be set in the focus state, wherein the high frequency component extractor detects the intensity of the black level signal during the initialization.

7. The imaging device in accordance with claim 3, wherein the optical system has an iris mechanism that regulates a light quantity of the optical image, and the high frequency component extractor detects the intensity of the specific signal in a closed state of the iris mechanism to at least a predetermined extent, as the intensity of the black level signal.

8. An autofocusing method for an optical system having a focusing function, the autofocusing method comprising:

detecting intensity of at least a specific signal in a certain frequency band, which includes a high frequency component and is generated in a focus state of an optical image captured via the optical system, from a video signal that is converted from the captured optical image by means of an imaging system;

learning an offset value based on the intensity of the specific signal detected in an out-of-focus state of the optical image captured via the optical system; and referring to the learnt offset value to estimate an adjustment direction of the optical system giving a peak of the detected intensity of the specific signal, and controlling the optical system in the estimated adjustment direction to be set in the focus state;

wherein, the controlling step includes a focus state identification step of specifying the peak of the detected intensity of the specific signal by referring to the learnt offset value and identifying a focus state of the optical system to give the peak of the detected intensity of the specific signal, and controlling the optical system to be set in the identified focus state; and wherein, in the step of controlling the optical system in the estimated adjustment direction to be set in the focus state, when the detected intensity of the specific signal decreases below a threshold value that is computed from the learnt offset value and a detected maximum intensity of the specific signal, the detected maximum intensity of the specific signal is specified as the peak of the intensity of the specific signal.

9. An imaging device that converts an optical image, which is captured via an optical system having a focusing function, into a video signal, the imaging device comprising:

a high frequency component extractor that adjusts the video signal with a preset gain controlled according to an imaging condition and detects intensity of at least a specific signal in a certain frequency band, which includes a high frequency component and is generated in a focus state of the optical image captured via the optical system, from the adjusted video signal;

a learning module that learns an offset value based on the intensity of the specific signal detected in an out-of-focus state of the optical image captured via the optical system; and an optical system controller that refers to the learnt offset value to estimate an adjustment direction of the optical system giving a peak of the detected intensity of the specific signal, and controls the optical system in the estimated adjustment direction to be set in the focus state;

wherein the high frequency component extractor adjusts a black level video signal, which does not include light in a depth of field at or over a predetermined level, with the preset gain, and detects an intensity of a black level signal from the adjusted black level video signal, and wherein the imaging device further comprises a brightness detector that measures intensity of a brightness signal of the video signal adjusted with the preset gain controlled according to the imaging condition, and wherein the learning module learns the offset value based on the detected intensity of the black level signal, the preset gain, and the measured intensity of the brightness signal.

* * * * *